United States Patent [19]

Matsuzaki

[11] Patent Number: 4,691,810

[45] Date of Patent: Sep. 8, 1987

[54] DISC BRAKE WITH PAD PRESSED ONLY AT ENDS WHERE ANTINODES OF VIBRATION OCCUR

[75] Inventor: Mikio Matsuzaki, Kasukabe, Japan

[73] Assignee: Akebono Brake Industry Company Ltd., Japan

[21] Appl. No.: 906,658

[22] Filed: Sep. 12, 1986

Related U.S. Application Data

[63] Continuation of Ser. No. 693,893, Jan. 23, 1985, abandoned.

[30] Foreign Application Priority Data

Feb. 2, 1984 [JP] Japan .............................. 59-12350[U]

[51] Int. Cl.[4] ...................... F16D 65/00; F16D 65/38
[52] U.S. Cl. ................................ 188/73.1; 188/73.37; 188/250 E; 188/264 G
[58] Field of Search ..................... 188/71.1, 73.1, 73.2, 188/370, 205 A, 73.31–73.47, 264 G, 250, 72.4–72.5; 192/30 V

[56] References Cited

U.S. PATENT DOCUMENTS

| | | | |
|---|---|---|---|
| 3,330,385 | 7/1967 | Swift .................................. | 188/73.43 |
| 3,403,756 | 10/1968 | Thirion .............................. | 188/73.43 |
| 3,477,551 | 11/1969 | Beuchle et al. .................. | 188/250 B |
| 4,155,430 | 5/1979 | Kawamura ....................... | 188/73.37 |
| 4,508,199 | 4/1985 | Herbulot et al. .............. | 188/73.1 X |

FOREIGN PATENT DOCUMENTS

| | | | |
|---|---|---|---|
| 2603795 | 8/1977 | Fed. Rep. of Germany ... | 188/73.35 |
| 57-160433 | 10/1982 | Japan . | |
| 57-181939 | 11/1982 | Japan . | |
| 1414915 | 11/1975 | United Kingdom . | |
| 2022733 | 12/1979 | United Kingdom ............. | 188/73.37 |
| 1561233 | 2/1980 | United Kingdom . | |
| 2143916 | 1/1985 | United Kingdom ............... | 188/73.1 |

Primary Examiner—Douglas C. Butler
Attorney, Agent, or Firm—Leydig, Voit & Mayer

[57] ABSTRACT

A pad is engaged by a rotor by hydraulic pressure whereas another pad is engaged by the rotor on the other side thereof by a pair of pawls of the caliper under reaction. The reaction of the caliper is imparted to the other pad in a plane where a pair of the pawls of the caliper are opposed to the other pad and in a position at the marginal edges of the other pad, thereby minimizing squeal when the brake is applied.

9 Claims, 10 Drawing Figures

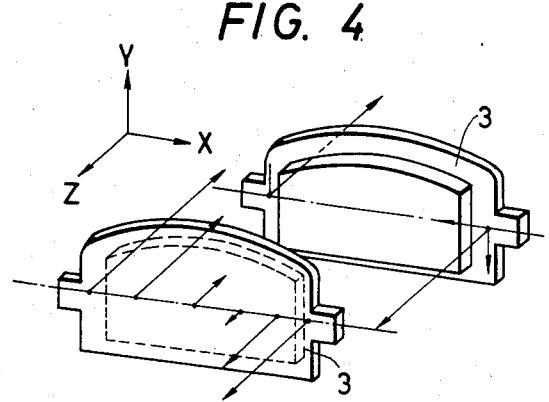
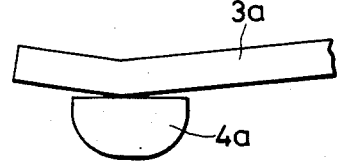
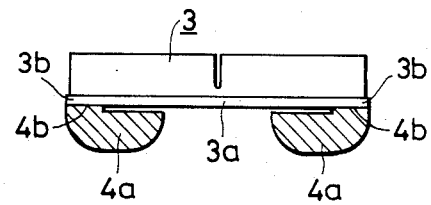
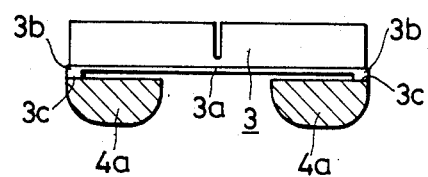
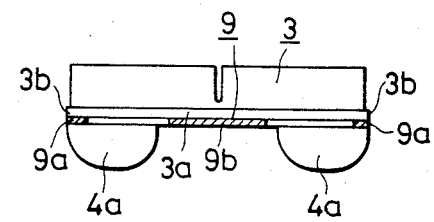
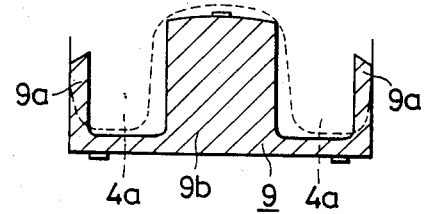

DISC BRAKE WITH PAD PRESSED ONLY AT ENDS WHERE ANTINODES OF VIBRATION OCCUR

This application is a continuation of application Ser. No. 693,893, filed Jan. 23, 1985, now abandoned.

BACKGROUND OF THE INVENTION

1. Field of the Invention

This invention relates to a disc brake used for braking an automobile and more particularly to construction of the disc brake for the prevention of noise in braking.

2. Description of the Prior Art

As shown in FIGS. 1 and 5, the disc brake is arranged so that a pair of inner and outer pads 3 are slidably mounted to hold a disc rotor 1 therebetween in the Z direction of the axle (rotor shaft) on a support 2 which is provided to hold therebetween the circumference of the rotor. The rotor is connected to a wheel for rotation thereof, the support 2 having mounted thereon a caliper 4 which is adapted for slidable movement in the Z direction of the axle and which is provided with caliper pawls 4a, 4a.

For braking, one pad (inner pad) is urged against one side of the rotor 1 and, by use of the caliper 4, is allowed to slide on the support 2 under reaction against the compressive force. The other pad (outer pad) is pressed against the other side of the rotor 1 by the caliper pawls 4a, 4a, thereby firmly clamping the rotor from the opposite sides thereof to effect braking.

Such disc brakes functioning in the aforementioned manner often generate a noise, thus giving passengers and pedestrians an unpleasant feeling.

Various devices have been proposed heretofore for prevention of the noise. Some of them have been adapted to dispose between the pads, piston, and the pawls a shim plate formed of sheet steel coated with rubber on one side thereof to reduce the noise. For this reason, this type of device has been widely employed.

What have been above proposed are, however, efficacious to reduce noise of more than about 5 KHz (hereinafter referred to as "first noise") but are not efficacious to reduce second noise of less than about 4–1.7 KHz (hereinafter referred to as "squeal"). The unpreventable squeal is not always produced in every model of a car but tends to be permanently generated once it does appear and is much noisier than the first noise. There have been instances in which a small-sized disc brake for a light car produces as loud a noise as a disc brake on a large truck.

FIG. 2 is a graph showing a frequency analysis of loudness of squeal wherein 5 designates a fundamental wave, and 6, 7 denote harmonics, 8 being background noise.

FIG. 3 is a graph showing a frequency analysis of loudness of the first noise wherein 9 indicates a fundamental wave of 6.2 KHz.

What will be listed hereinafter has been found by the aforementioned measurement of squeal.

(1) Amplitude of vibration is shown as the highest in the pad out of the important components (i.e., components such as the caliper, pad, support and the rotor) but amplitude is too low in the others to take up.

(2) Amplitude is also shown as the highest in the Z direction of the pad, out of the directions X, Y and Z shown in FIG. 4.

(3) FIG. 4 shows direction of amplitude at the moment when squeal is generated, as well as magnitude of amplitude, wherein the opposite ends of the pad are the positions where an antinode of amplitude occurs in the Z direction and the center is the position where a node occurs.

It has been observed from what is aforementioned that the conventional disc brake is not so fabricated that amplitude of the opposite ends of the pad, depicted as where the antinode occurs when the squeal is produced, is efficiently lowered. In other words, the position where the pad is held by the caliper pawls is inside the end of the pad. Further, the surfaces of the caliper pawls which abut against the pad are finished by cutting and machining to a higher tolerance. In general, the back metal on the pad set against such surfaces is simply punched out of blank such as a steel plate. The back metal 3a does not uniformly contact the pawl 4a to render amplitude damping action unstable whereby a squeal is readily generated.

Japanese Utility Model Public Disclosures Nos. 160433/82 and 181939/82 are intended to prevent the disc brake from generating squeal and designed to have the caliper pawls hold in the neighborhood of a portion of the pad at which a node occurs, thereby lowering the sound. This is entirely different from the present invention which is adapted to hold the ends of the pad to be the position at which the antinode occurs.

SUMMARY OF THE INVENTION

It is an object of the invention to provide a disc brake which is capable of preventing squeal in an outer pad that is pressed against a rotor by caliper pawls. No consideration is given to another pad, that is, an inner pad held by a piston since it has been observed that no squeal is produced when the outer pad is so held as to prevent squeal.

This and the other objects and advantages of the invention will be understood from the following description as to a preferred embodiment referring to the accompanying drawings.

BRIEF DESCRIPTION OF THE DRAWINGS

FIG. 4 is a perspective view of the pad illustrating the manner of how the pad is vibrated;

FIG. 5 is a plan view of the caliper pawls and the pad back metal according to the prior art and exaggeratively showing the manner in which they are engaged with each other;

FIG. 6 is a plan view of a first embodiment of the invention;

FIG. 7 is a side view looking from the right of FIG. 6;

FIG. 8 is a plan view of a second embodiment;

FIG. 9 is a plan view of a third embodiment; and

FIG. 10 is a front view looking from the bottom of FIG. 9.

DESCRIPTION OF THE PREFERRED EMBODIMENTS

Figure 1:
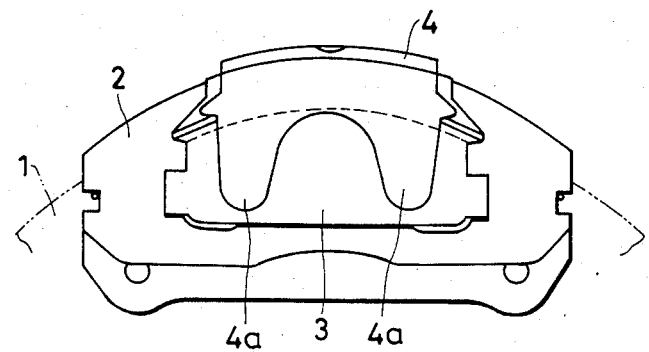
FIG. 1 is a front view illustrating a structure of a disc brake.

The present invention is contemplated so that narrow ledges are pressed against the ends of the pad by machining the caliper pawls and the pad back metal portion or inserting the spacer thereinto for prevention of vibration in a manner that the ends of the outer pad are pressed at the antinodes of the vibrations, i.e., the positions of maximum amplitude of vibration.

In a first embodiment shown in FIGS. 6 and 7, ledges 4b are formed to provide surfaces lying in a plane where a pair of the caliper pawls 4a are opposed to the pad back metal 3a and having a position far away from the center and at the marginal edge of the outer pad. These surfaces of the ledges 4b are adapted to abut against the ends 3b of the pad back metal portion in the plane where they are opposed. No machining is required of the ledges to cut the same off from the pawls 4b since they are formed simultaneously with casting the caliper. In other words, machining is simple since it is only required to finish the surfaces of the ledges.

With the provision of the ledges 4b, the pad back metal 3a is capable of forcibly holding the ends 3b where the antinodes of the vibrations occur to lessen vibration and to eliminate the squeal or render the same low if generated.

FIG. 8 shows a second embodiment which is designed so that the surfaces of the caliper pawls 4a against the pad back metal portion 3a are made flat, and so that ledges 3c extending in the radial direction of the rotor are formed in the ends circumferentially of the back metal portion 3a to provide surfaces abutting against the pawls 4a. Vibrations of the ends of the back metal portion are prevented by the ledges 3c to arrest the squeal as in the same manner of the first embodiment.

FIGS. 9 and 10 illustrate a third embodiment for use with a spacer 9 of sheet metal. The spacer 9 is in the shape of an E and includes longitudinal ends 9a interposed between the ends of the back metal portion circumferentially of the rotor and the pawls 4a, and a center 9b with a larger area attached to the back metal portion between the pawls 4a, 4a. In this manner, the ends of the pad back metal portion are held by the elongated ends 9a to thus generate no squeal as in the same manner of the ledges in the previous embodiment.

Figure 2:
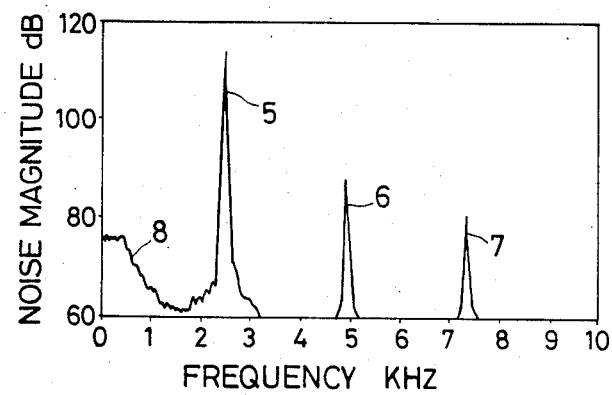
FIG. 2 is a graph showing a frequency analysis of loudness of squeal.
Figure 3:
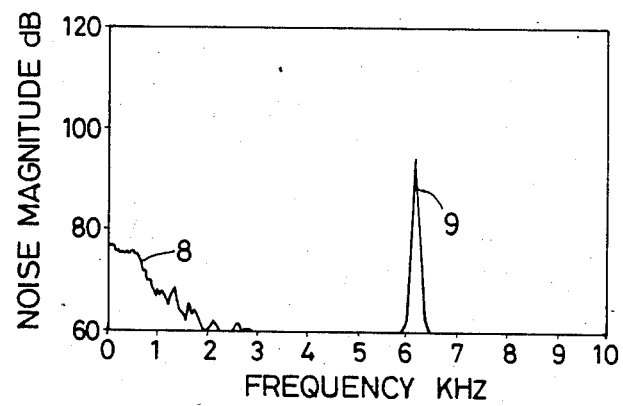
FIG. 3 is a graph showing a frequency analysis of loudness of first noise.

(1) The disc brake according to the invention is intended to hold the ends of the pad back metal which generate the loudest squeal in order to arrest said squeal or render the same too low to take up, on the basis of the result as measured in FIG. 2.

(2) It is a matter of choice to either use (a) the longitudinal ledges 4b formed on the outer (i.e., marginal) ends of the caliper pawls, or (b) the longitudinal ledges at the outer (i.e., marginal) ends of the pad back metal, or (c) the longitudinal and elongated leg portions of a spacer disposed on the outer (i.e., marginal) ends between the caliper pawls and the pad back metal portion or a combination of such means for holding the ends of the pad back metal portion.

(3) A test using the (a) embodiment was applied to a disc brake which generated a squeal of 116–128 dB and showed that no squeal was produced. This was also the case with the (b) embodiment.

While the features and advantages of the invention have been described in the foregoing with respect to preferred embodiments, as way of example, various changes and modifications may be made without limiting to the embodiments illustrated in the drawing within the scope of the appended claims.

What is claimed is:

1. A disc brake comprising:
    a caliper slidable in the axial direction of a rotor to be damped, said caliper including pressure means disposed on one side of said rotor and a pair of pawls having peripheral margins located on the other side of said rotor and spaced circumferentially of said rotor to extend radially thereof,
    a pair of pads, one pad being adapted to engage said rotor on one side thereof by said pressure means, the other pad adapted to engage said rotor on the other side thereof by said pair of said pawls under reaction, said other pad having a back metal portion, one of said back metal portion of said other pad and said pair of pawls being provided with ledges at the outer peripheral margins of each of said pawls abutting and in superposed relationship to the other of said back metal portion of said other pad and said pair of pawls along a plane, said ledges defining recesses wherein inward of said outer peripheral margins said pair of pawls are in spaced facing relationship with said back metal portion, and
    transmission means for imparting said reaction to said other pad in said plane where said pair of pawls of said caliper and said other pad are in superposed relationship to each other and only at the peripheral margins of the pawls of said caliper and said other pad such that ends of said other pad are pressed at antinodes of vibration.

2. A disc brake as claimed in claim 1 wherein said transmission means is positioned to extend substantially radially and adjacent to the circumference of said rotor.

3. A disc brake as claimed in claim 2 wherein said ledges are formed in said caliper pawls and extend radially of said rotor.

4. A disc brake as claimed in claim 3 wherein said ledges are symmetrical.

5. A disc brake as claimed in claim 2 wherein said ledges are formed in the back metal portion of said pad and extend radially of said rotor.

6. A disc brake as claimed in claim 5 wherein said ledges are symmetrical.

7. A disc brake as claimed in claim 1 wherein the openings of said recesses face each other.

8. A disc brake comprising:
    a caliper slidable in the axial direction of a rotor to be damped, said caliper including pressure means disposed on one side of said rotor and a pair of pawls having peripheral margins located on the other side of said rotor and spaced circumferentially of said rotor to extend radially thereof,
    a pair of pads, one pad being adapted to engage with said rotor on one side thereof by said pressure means, the other pad being adapted to engage with said rotor on the other side thereof by said pair of said pawls under reaction, said pair of pawls being opposed to said other pad along a plane, and
    transmission means for imparting said reaction to said other pad in said plane where said pair of pawls of said caliper and said other pad are in superposed relationship to each other and only at the outer peripheral margins of the caliper pawls and said other pad such that the ends of the pad are pressed at antinodes of vibration, said transmission means further including a spacer of sheet metal disposed between said other pad and said pair of caliper pawls only at their outer peripheral margins wherein inward of said outer peripheral margins said pair of pawls and said back metal portion are in spaced facing relationship.

9. A disc brake as claimed in claim 8 wherein the openings of said recesses face each other.

* * * * *